United States Patent [19]

Salzberg

[11] Patent Number: 5,224,275
[45] Date of Patent: Jul. 6, 1993

[54] APPARATUS FOR MEASURING THE PROTRUSION OF AN END OF AN OPTICAL FIBER TERMINATED IN A CONNECTOR

[75] Inventor: Jose B. Salzberg, Des Plaines, Ill.
[73] Assignee: Molex Incorporated, Lisle, Ill.
[21] Appl. No.: 898,657
[22] Filed: Jun. 15, 1992
[51] Int. Cl.$^5$ .............................................. G01B 5/14
[52] U.S. Cl. ...................................... 33/833; 33/712; 33/555
[58] Field of Search ............... 33/833, 832, 712, 549, 33/555, 556

[56] References Cited

U.S. PATENT DOCUMENTS

| | | | |
|---|---|---|---|
| 2,560,571 | 7/1951 | Hawkins | 33/833 |
| 3,183,597 | 5/1965 | Donaldson et al. | 33/556 |
| 3,334,419 | 8/1967 | Jaye | 33/832 |
| 3,413,726 | 12/1968 | Sankovich | 33/833 |
| 3,848,339 | 11/1974 | Strasbaugh | 33/832 |
| 4,653,191 | 3/1987 | Gasser | 33/833 |
| 4,930,226 | 6/1990 | Shindelar | 33/832 |
| 4,993,167 | 2/1991 | Durfee, Jr. | 33/712 |
| 5,077,909 | 1/1992 | Cranor | 33/833 |

FOREIGN PATENT DOCUMENTS 1428907 10/1988 U.S.S.R. ................. 33/834

Primary Examiner—William A. Cuchlinski, Jr.
Assistant Examiner—C. W. Fulton
Attorney, Agent, or Firm—A. A. Tirva

[57] ABSTRACT

An apparatus is provided for measuring the distance an optical fiber terminated in a connector protrudes from a component of the connector such as a ferrule or the like. A fixed abutment member defines an abutment surface against which the connector component can be moved into engagement. A movable measuring member is mounted for movement relative to the fixed abutment member and is engageable by a distal end of the optical fiber as the connector component is moved into engagement with the abutment surface of the fixed abutment member. Therefore, the amount of relative movement between the movable measuring member and the fixed abutment member directly corresponds to the distance the optical fiber protrudes from the connector component. Calculating electronics are operatively associated with at least the movable measuring member for calculating its amount of movement and, thereby, the protruding distance of the optical fiber. The electronics includes providing a portion of the movable measuring member and a portion of the fixed abutment member as capacitor plates and the capacitance thereof is utilized to calculate the protruding distance of the optical fiber.

7 Claims, 2 Drawing Sheets

APPARATUS FOR MEASURING THE PROTRUSION OF AN END OF AN OPTICAL FIBER TERMINATED IN A CONNECTOR

FIELD OF THE INVENTION

This invention generally relates to the art of electrical or communications connectors and, particularly, to an apparatus for measuring the distance an optical fiber terminated in a connector protrudes from a component of the connector, such as a connector ferrule or the like.

BACKGROUND OF THE INVENTION

In order to obtain good performance in fiber optic connectors, the distal ends of the fibers terminated in a pair of mating connectors usually are maintained in physical contact with each other. The ends of the fibers conventionally are flat, polished and in abutment with each other to minimize transmission losses between the fibers. The fiber ends protrude slightly from components of the mating connectors, such as ceramic ferrules which embrace the fibers.

One of the problems in fiber optic connectors of the character described is to maintain a particular protruding length of the fibers beyond the connector components or ferrules. If the protruding end of a fiber is too long, the fiber can break due to high stresses created in the mated connectors. If the fiber protrusion is too short, physical contact between the fiber ends can be difficult, resulting in a decrease in performance/transmission quality, i.e. an increase in transmission losses. For instance, it has been found that fiber protrusion in a given fiber optic connector may be as small as in the 0.1 to 2.5 micron range, in order to establish a good physical contact between the abutting ends of the optical fibers.

Presently, there are no known instruments which can accurately measure such small protruding distances in production or field environments. Heretofore, laboratory-type equipment of a complex and expensive nature has been the only means known to perform such measurements. This invention is directed to providing a relatively simple apparatus for accurately measuring the fiber protrusion distances in conventional fiber optic connectors.

SUMMARY OF THE INVENTION

An object, therefore, of the invention is to provide a novel apparatus for measuring the distance an optical fiber protrudes from a component of a fiber optic connector within which the optical fiber is terminated.

In the exemplary embodiment of the invention, generally, the measuring apparatus includes a fixed abutment member against which the connector component can be moved into engagement. A movable measuring member is mounted for movement relative to the fixed abutment member and is engageable by a distal end of the optical fiber as the connector component is moved into engagement with the fixed abutment member. Therefore, the amount of relative movement between the movable measuring member and the fixed abutment member directly corresponds to the distance the optical fiber protrudes from the connector component. Calculating means are provided, operatively associated with at least the movable measuring member of the apparatus, for calculating its amount of movement and, thereby, the protruding distance of the optical fiber.

As disclosed herein, the fixed abutment member of the apparatus is provided in the form of a ferrule-like member shaped complementarily to the connector component or ferrule. An alignment sleeve surrounds the fixed abutment member and projects from an end thereof for guiding the connector component into abutment therewith. The movable measuring member is provided in the form of a needle-like member telescoped within a passageway through the fixed abutment member, with a distal end of the needle-like member engageable by the distal end of the optical fiber. The passageway is configured such that the distal end of the optical fiber is movable thereinto as the fiber moves the needle-like member.

Generally, the invention contemplates that the calculating means include means for sensing relative movement between the movable measuring member and the fixed abutment member, means coupled to the sensing means for generating an electrical signal, and means responsive to the electrical signal for determining the protruding distance of the optical fiber. In the illustrated embodiment of the invention, the means for sensing relative movement between the movable measuring member and the fixed abutment member are provided as capacitor means including one capacitor plate coupled to the movable measuring member and another capacitor plate fixed to the fixed abutment member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
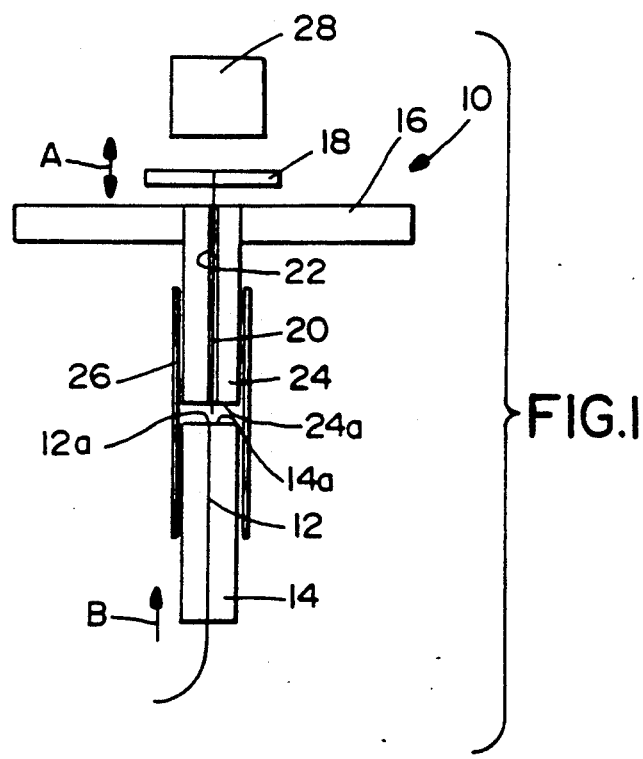
FIG. 1 is a schematic illustration of an apparatus embodying the concepts of the invention.

Referring to the drawings in greater detail, and first to FIG. 1, an apparatus, generally designated 10, is shown for measuring the distance an optical fiber 12, terminated in a connector, protrudes from a component 14 of the connector. As is conventional in fiber optic connectors, component 14 often is a ceramic or metal ferrule having a generally planar end 14a beyond which a protruding distal end 12a of the optical fiber protrudes. The protruding distal end of the optical fiber is intended to engage or make physical contact with the distal end of another optical fiber of a mating connector, all of which is known in the art. Fiber end 12a often protrudes from ferrule 14 a small distance on the order of 0.1 to 2.5 microns. This range is acceptable for establishing a good physical contact with the fiber end of a mating connector. Apparatus 10 is designed to measure the protruding distance of fiber end 12a to insure that the distance the fiber end protrudes from planar end 14a of connector component 14 is in the acceptable range.

More particularly, apparatus 10 includes a fixed abutment member 16 and a movable measuring member which includes a holder 18 and a needle 20 fixed to the holder whereby the needle can move with the holder in the direction of double-headed arrow "A" relative to fixed abutment member 16. Needle 20 extends through a passageway 22 in a ferrule-like portion 24 of fixed abutment member 16. Ferrule-like portion 24 is shaped complementarily to connector component or ferrule 14, and an alignment sleeve 26 surrounds the ferrule-like portion and the connector component so that, upon insertion of the connector component into the sleeve in the direction of arrow "B", fiber end 12a will be in alignment with needle 20 and passageway 22.

Generally, a position sensing means 28 is provided for sensing movement of holder 18 and needle 20 relative to fixed abutment member 16 and its depending ferrule-like portion 24. Various forms of position sensing means can be employed, a specific capacitor sensing system being shown in FIGS. 3 and 4 which will be described in greater detail hereinafter.

Figure 2:
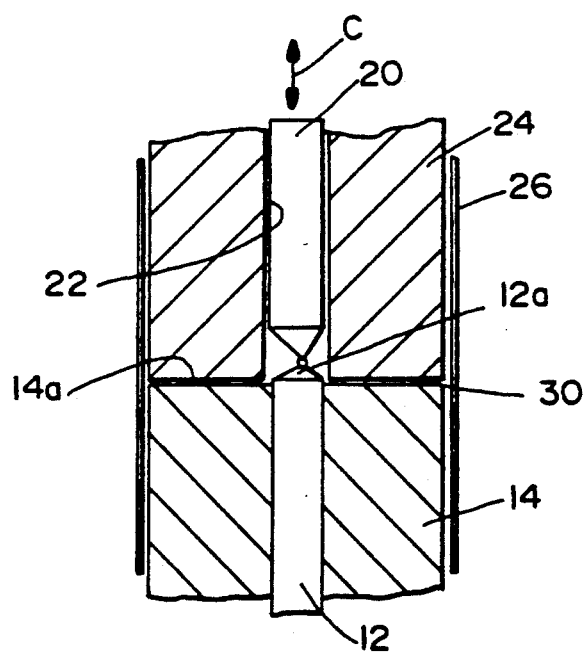
FIG. 2 is a section, on an enlarged scale, through the measuring area of the apparatus.

FIG. 2 shows an enlarged depiction of connector component or ferrule 14 and the ferrule-like portion 24 of fixed abutment member 16 in alignment within alignment sleeve 26. It can be seen that protruding end 12a of optical fiber 12 is in alignment with and, in fact, is shown already projecting into passageway 22, with needle 20 being reciprocal within the passageway in the direction of double-headed arrow "C".

The simplicity of operation of apparatus 10 is one of its major attributes. In operation, a user simply inserts connector component 14 into the bottom of alignment sleeve 26 in the direction of arrow "B". Needle 20 extends downwardly through passage 22 at least to the bottom surface 24a so that initial engagement is between fiber end 12a and the end of the needle. Further movement of the connector component causes the needle and its holder 18 to move upwardly relative to fixed abutment member 16 and its ferrule-like portion 24, until connector component 14 abuts against the ferrule-like portion. Further movement of the connector component is stopped, and the relative movement between fixed abutment member 16 and holder 18 of the movable measuring member can be measured by using an appropriate position sensing device.

It should be understood that a variety of position sensing devices could be used, such as capacitive sensors, variable reluctance sensors, sensors of the fiber optic reflective type, or the like. A capacitive sensing scheme will be described below, in relation to FIGS. 3 and 4. It also should be understood that the amount of movement of needle 20 and holder 18 of the movable measuring member does not have to be precisely equal to the distance fiber end 12a protrudes from connector component 14, because measurements can be made based on a particular position of movable measuring member 18 and needle 20. In other words, referring to FIG. 2, abutment interface 30 between connector component 14 and ferrule-like portion 24 of movable measuring member 16, defines a reference surface for measurement. The distance which fiber end 12a projects beyond planar surface 14a of connector component 14 defines the position of needle 20 relative to abutment interface 30. Of course, this protruding distance also is defined by the position of holder 18 of the movable measuring member (which is fixed to the movable needle) and fixed abutment member 16 (which is fixed to ferrule-like portion 24).

Figure 3:
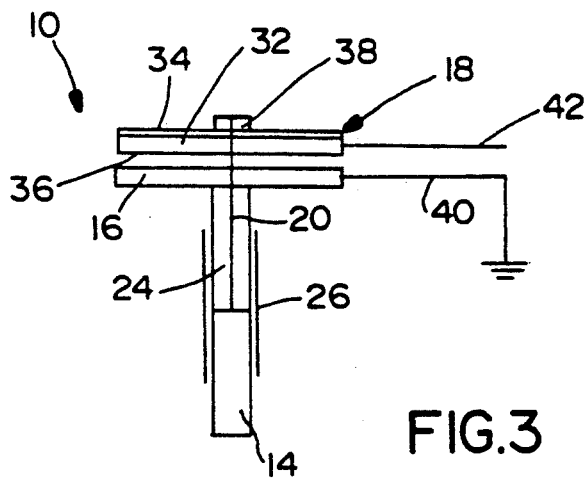
FIG. 3 is a schematic illustration of an apparatus using a capacitive sensor means.
Figure 4:
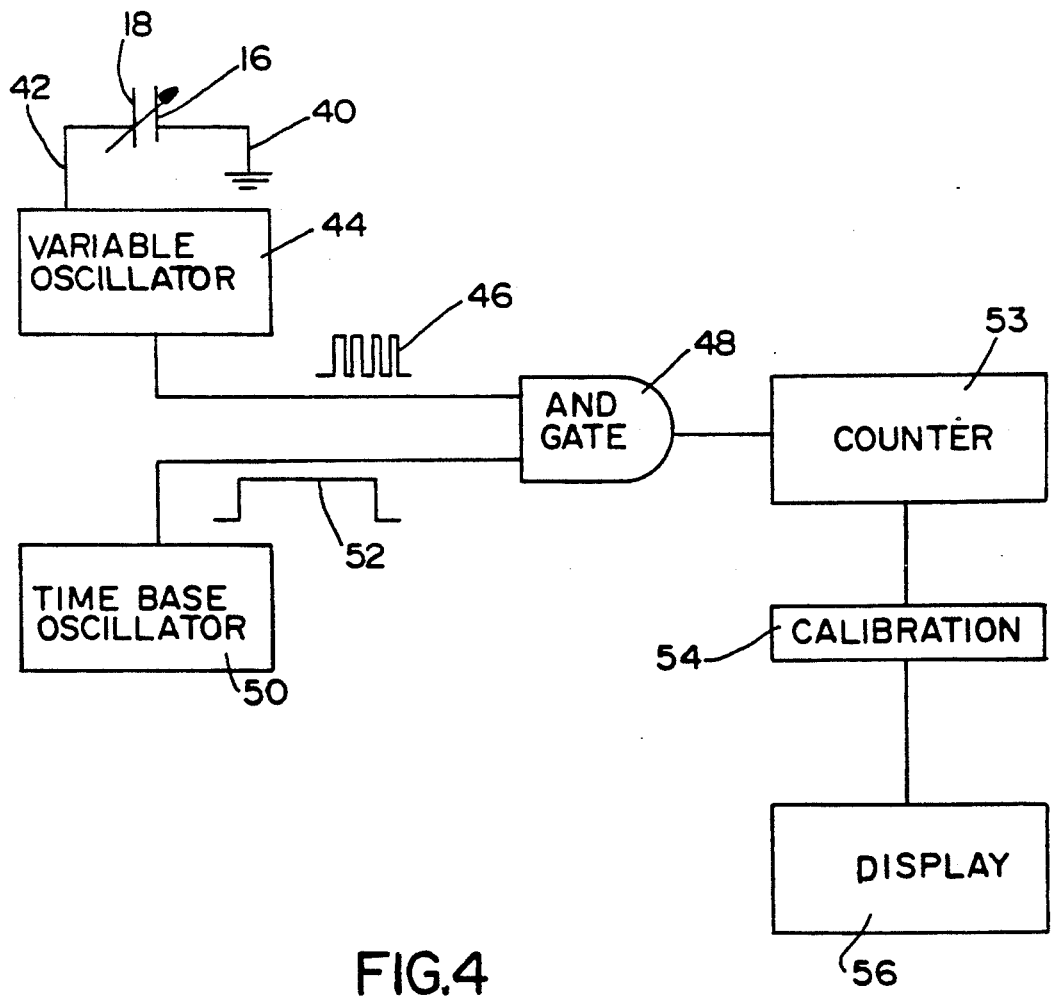
FIG. 4 is a block diagram of the electronics involved in using the capacitive sensor means.

With that understanding, reference is made to FIG. 3 wherein a capacitive position sensing arrangement is shown. Like numerals have been applied to like components as described above in relation to FIGS. 1 and 2, except that the movable measuring member is now generally referenced as 18. More particularly, FIG. 3 shows connector component 14 moved into alignment sleeve 26 into abutment with ferrule-like portion 24 depending from fixed abutment member 16. The fixed abutment member is fabricated in the form of a magnetic steel disc. Movable measuring member 18 is a laminated structure fabricated of an aluminum disk 32 sandwiched between a magnet washer 34 and a dielectric film 36. Needle 20 is fixed by an appropriate fastening means 38 to the laminated movable measuring member 18. Fixed abutment member 16 and movable measuring member 18, in essence, form capacitor plates connected by electrical contacts or leads 40 and 42, respectively, to a variable oscillator, as will be described below in relation to FIG. 4.

In operation of the arrangement described above in relation to FIG. 3, when no connector component 14 is inserted into alignment sleeve 26, movable measuring member (capacitor plate) 18 is maintained in contact with fixed abutment member (capacitor plate) 16 either by gravity, by an appropriate spring, by a magnetic washer 34 as shown in FIG. 3, or by any other appropriate means. This contacting position establishes a basic capacitance. When a connector component 14, having a protruding fiber end to be measured, is inserted into alignment sleeve 26, the fiber end will engage the distal end of needle 20 and move measuring member (capacitor plate) 18 away from fixed abutment member (capacitor plate) 16, and the capacitance between the two plates changes. In essence, this change is a function of the fiber protrusion and can be detected by electrical means described below.

Specifically, conductors or leads 40 and 42 are connected to a variable oscillator circuit 44. The variable oscillator circuit generates a pulse train signal, shown at 46, having a frequency varying as a function of the capacitance of the capacitor plates 16 and 18. The oscillator circuit 44 is connected to an input of an AND gate 48. Another input of the AND gate 48 is connected to a time base oscillator circuit 50. The time base oscillator circuit 50 generates a fixed frequency signal, shown at 52, at a frequency significantly lower than the variable oscillator 44. As a result, the AND gate 48 outputs the variable frequency signal 46 during the time base determined by the fixed frequency signal 52. This provides a fixed time base during which pulses in the variable frequency pulse train 46 are counted by a counter 53 to provide a total count. This total count, which is proportional to the frequency of the pulse train, represents capacitance. The count total from the counter 53 is then converted into microns or any other appropriate unit by interpolation on a calibration curve by a calibrating device 54, the result being displayed on a display device 56. It should be understood that a microprocessor could be used to perform most of these functions.

It should be understood that the measuring apparatus can also be used to measure small negative protrusions of the fiber end 12a, i.e. recess of the fiber end below the planar end 14a of the ferrule due to overpolishing.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An apparatus for measuring the distance an optical fiber terminated in a connector protrudes from a component of the connector such as a ferrule or the like, comprising:

a fixed abutment member against which the connector component can be moved into engagement;

a movable measuring member mounted for movement relative to the fixed abutment member and engageable by a distal end of the optical fiber as the connector component is moved into engagement with the fixed abutment member, whereby the amount of relative movement between the movable measuring member and the fixed abutment member directly corresponds to the distance the optical fiber protrudes from the connector component;

wherein at least a portion of said movable measuring member is telescoped within a passageway in the fixed abutment member and projects at least to an end of the abutment member which defines an abutting reference surface against which the connector component is engageable, with the distal end of the optical fiber being movable into the passageway, and wherein said fixed abutment member includes a ferrule-like portion shaped complementarily to the connector component, and including an alignment sleeve surrounding the fixed abutment member and projecting from said end thereof for guiding the connector component and, thereby, optical fiber into alignment with the passageway; and position sensing means operatively associated with at least the movable measuring member for sensing its amount of movement and, thereby, the protruding distance of the optical fiber.

2. The apparatus of claim 1 wherein said movable measuring member includes a needle having a distal end engageable by the distal end of the optical fiber.

3. The apparatus of claim 1 wherein said position sensing means include means for sensing relative movement between the movable measuring member and the fixed abutment member.

4. The apparatus of claim 3, including means coupled to said position sensing means for generating an electrical signal.

5. The apparatus of claim 4, including calculating means responsive to the electrical signal for determining the amount the optical fiber protrudes from the connector component.

6. The apparatus of claim 3 wherein said means for sensing relative movement between the movable measuring member and the fixed abutment member comprise capacitor means operatively associated between the movable measuring member and the fixed abutment member.

7. An apparatus for measuring the distance an optical fiber terminated in a connector protrudes from a connector ferrule or the like, comprising:

a fixed ferrule having first and second ends with a through passage between the ends, the first end defining an abutment surface against which the connector ferrule can be moved into engagement;

a measuring member at the second end of the fixed ferrule for movement relative thereto and including a needle extending through the passage and having a distal end near the abutment surface at the first end of the fixed ferrule, the distal end of the needle being engageable by a distal end of the optical fiber as the connector ferrule is moved into engagement with the abutment surface, whereby the amount of relative movement between the movable measuring member and the fixed ferrule directly corresponds to the distance the optical fiber protrudes from the connector ferrule;

alignment means surrounding the fixed ferrule and projecting from the first end thereof for guiding the connector ferrule and, thereby, the distal end of the optical fiber into alignment with the distal end of the needle in the passage; and position sensing means operatively associated with at least the movable measuring member for sensing its amount of movement and, thereby, the protruding distance of the optical fiber.

* * * * *